(12) United States Patent  (10) Patent No.: US 8,024,015 B2
Araki et al.  (45) Date of Patent: Sep. 20, 2011

(54) MOBILE DEVICE

(75) Inventors: Tatsuhito Araki, Kawasaki (JP);
Hiroaki Matsuda, Kawasaki (JP);
Yoshiya Matsumoto, Kawasaki (JP);
Manabu Sotodate, Kawasaki (JP);
Wataru Murata, Kawasaki (JP); Ken Shoji, Kawasaki (JP); Ryo Hattori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 12/254,287

(22) Filed: Oct. 20, 2008

(65) Prior Publication Data

US 2009/0117957 A1    May 7, 2009

(30) Foreign Application Priority Data

Oct. 30, 2007   (JP) .................................. 2007-281995

(51) Int. Cl.
*H04M 1/00*    (2006.01)
(52) U.S. Cl. ..................... 455/575.1; 455/572; 455/573; 455/575.8; 455/550.1; 249/179; 249/178; 249/167; 249/186; 249/97; 249/100

(58) Field of Classification Search .................. 455/572, 455/573, 575.8; 429/179, 178, 167, 186, 429/97, 100
See application file for complete search history.

(56) References Cited

U.S. PATENT DOCUMENTS

| 7,406,324 B1* | 7/2008 | McConnell ................... 455/466 |
| 2004/0089570 A1* | 5/2004 | Chien et al. .................... 206/320 |
| 2006/0121338 A1* | 6/2006 | Ge et al. ........................ 429/97 |

FOREIGN PATENT DOCUMENTS

| JP | 11-25940 | 1/1999 |
| JP | 2004-56164 | 2/2004 |

* cited by examiner

*Primary Examiner* — Kwasi Karikari
(74) *Attorney, Agent, or Firm* — Staas & Halsey LLP (57) ABSTRACT

A mobile device having a housing and operating on power supplied from the battery loaded in the battery chamber including: a pair of walls of the housing having hook receiving portions formed a groove; a battery lid covering the battery chamber so as to be freely detached; a pair of positioning hooks serving to position the battery lid by entering the grooves of the corresponding hook receiving portions; overhanging edges serving to regulate position of the cover lid; and a waterproof gasket fixed to the battery chamber side of the cover lid so as to be in contact with all sides of the battery chamber.

10 Claims, 11 Drawing Sheets

MOBILE DEVICE

CROSS-REFERENCE TO RELATED APPLICATIONS

This application is based upon and claims the benefit of priority of the prior Japanese Patent Application No. 2007-281995, filed on Oct. 30, 2007, the entire contents of which are incorporated herein by reference.

BACKGROUND

1. Field

An aspect of the invention relates to a mobile device that has, for example, a housing defining a battery chamber in which a battery is loaded, and a battery lid covering the battery chamber so as to be freely detached, and that runs on power supplied from the battery loaded in the battery chamber.

2. Description of the Related Art

Recently, the use of mobile devices such as mobile phones and handheld video game machines has greatly increased. Most of such mobile devices have batteries loaded therein and run on power supplied from the batteries.

While these mobile devices such as mobile phones incorporate more sophisticated functions, the device size and weight are further reduced. Nowadays, there is also a demand for a waterproof function. Where the waterproof function is incorporated in the mobile device that has a housing in which a large opening is defined for the battery chamber for loading the battery therein, rendering the battery chamber waterproof poses a problem.

For example, Japanese Laid-open Patent Publication No. 2004-56164 discloses rendering a battery pack storage section waterproof by means of an O-ring and an inner cover. Japanese Laid-open Patent Publication No. 11-25940 discloses rendering a battery pocket waterproof by means of a battery lid and waterproof packing.

In this case, it is important to render the battery chamber and its periphery waterproof without increasing the size and weight of the mobile device. Generally, a battery chamber and its periphery are rendered waterproof by fixing packing or an O-ring inside the lid which covers the battery chamber, and by pressing the packing or O-ring against the edges of the battery chamber. In this case, it is necessary that the packing or O-ring be pressed against the edges of the battery chamber without being twisted, specifically, it is necessary that force is applied only in the direction in which the packing or O-ring is pressed against the edges, not sideways to the packing or O-ring. To achieve this, it is best to depress the lid from directly above the battery chamber. However, depressing the lid from directly above the battery chamber, while keeping the lid and body joined, requires a complicated structure. This frustrates the demand for a more compact design. Employing a structure in which the lid which covers the battery chamber is pivotally supported by the body so as to be freely opened or closed around a rotation shaft extending along one side of the lid may produce sideways force in the packing or O-ring disposed inside the lid. A design taking account of such sideways force such that this sideways force is not varied by a user closing the lid may keep the sideways force within permissible levels. However, in this case, a structure in which the rotation shaft is pivotally supported by the body so as to be freely rotated may increase the size of the mobile device.

To make the mobile device more compact, it is preferable that the lid can be completely separated from the body. In this case, sideways force acting on the packing or O-ring disposed inside the lid may be varied according to subtle changes in the manner in which the lid is closed by a user. Therefore, how to always keep the sideways force, that is, torsion of the packing or O-ring within permissible levels poses a problem.

SUMMARY

It is an object of the embodiment to provide a mobile device in which a battery chamber and its periphery is rendered sufficiently waterproof without increasing the size of the mobile device.

According to an aspect of the embodiment, a mobile device including: a housing defining a battery chamber in which a battery is loaded; and a battery lid for covering the battery chamber so as to be freely detached, the mobile device running on power supplied from the battery loaded in the battery chamber, wherein the housing includes: a bottom defining a bottom face for the battery chamber; a pair of left and right upright walls extending upright from the left and right edges of the bottom face such that the internal wall faces of the upright walls define left and right wall faces for the battery chamber, and having hook receiving portions formed in external wall faces of the upright walls and near the fronts of these external wall faces, each of the hook receiving portions being formed from a groove that has an open upper edge and curves downwards and forwards from this opening; a front wall extending upright from the front edge of the bottom face, thereby defining a front wall face for the battery chamber, and defining seating extending forward from the upper edge of the wall face so as to be parallel to the bottom face; and a rear wall extending from the rear edge of the bottom face, thereby defining a rear wall face of the battery chamber, and the battery lid includes: a cover plate covering the battery chamber; a pair of left and right positioning hooks bent near the fronts of the left and right edges of the cover plate, curving downwards and forwards, and serving to position the battery lid by entering the grooves of the corresponding hook receiving portions; overhanging lower edges bent from the front edge of the cover plate and serving to regulate upward or downward position of the cover lid by coming into contact with the seating when the battery lid is moved forward obliquely downward; and a waterproof gasket fixed to the battery chamber side of the cover plate so as to be in contact with all sides of the battery chamber.

Additional objects and advantages of the embodiment will be set forth in part in the description which follows, and in part will be obvious from the description, or may be learned by practice of the embodiment. The object and advantages if the embodiment will be realized and attained by means of the elements and combinations particularly pointed out in the appended claims.

It is to be understood that both the foregoing general description and the following detailed description are exemplary and explanatory only and are not restrictive of the embodiment, as claimed.

DETAILED DESCRIPTION OF THE PREFERRED EMBODIMENTS

The mobile device disclosed in the preferred embodiment will be described below in detail with reference to figures.

Figure 1:
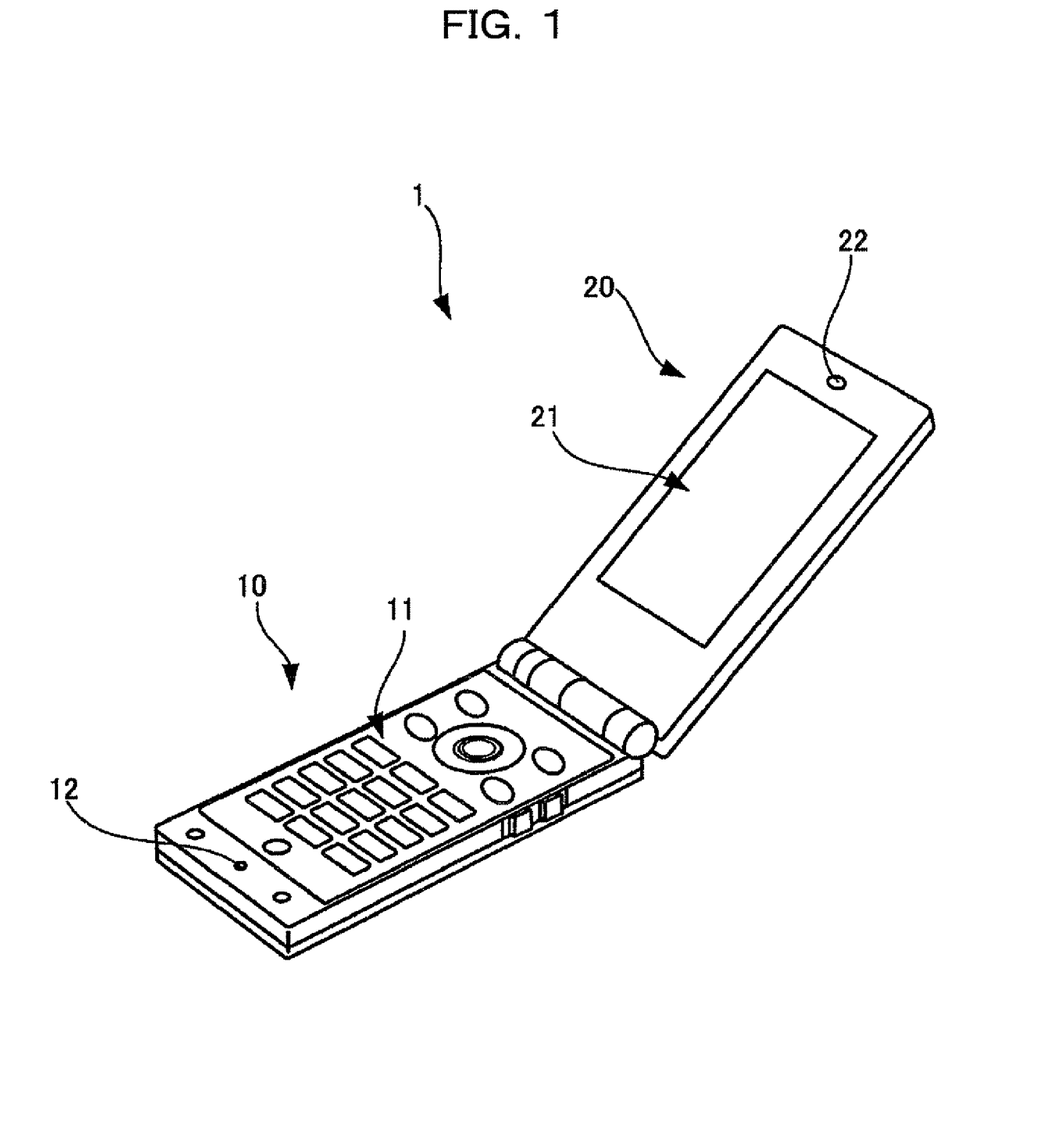
FIG. 1 is a perspective view of the appearance of a mobile phone that is an embodiment of the mobile device disclosed in a preferred embodiment.

FIG. 1 is a perspective view of the appearance of a mobile phone that is an embodiment of the mobile device disclosed in the preferred embodiment.

The mobile phone 1 includes a body unit 10 and a display unit 20. The display unit 20 is pivotally supported by the body unit 10 so that it may be opened or closed.

Disposed on the body unit 10 are a number of keys 11 for inputting telephone numbers or various other information by a user. Disposed at the lower end of the body unit 10 is a mouthpiece 12 connected to a microphone disposed inside.

The display unit 20 has in its central area a display screen 21 for displaying images. Above the display screen 21 is an earpiece 22 for outputting sound from a sound producer disposed inside.

Loaded in the mobile phone 1 is a battery pack, and the mobile phone 1 runs on power supplied from the battery pack which is loaded.

This mobile phone 1 incorporates, in addition to a radio telephone function, electronic mail transmission or reception functions, and various other functions. A description will now be given focusing on the structure of the battery chamber and its periphery that are specific to the present embodiment.

Figure 2:
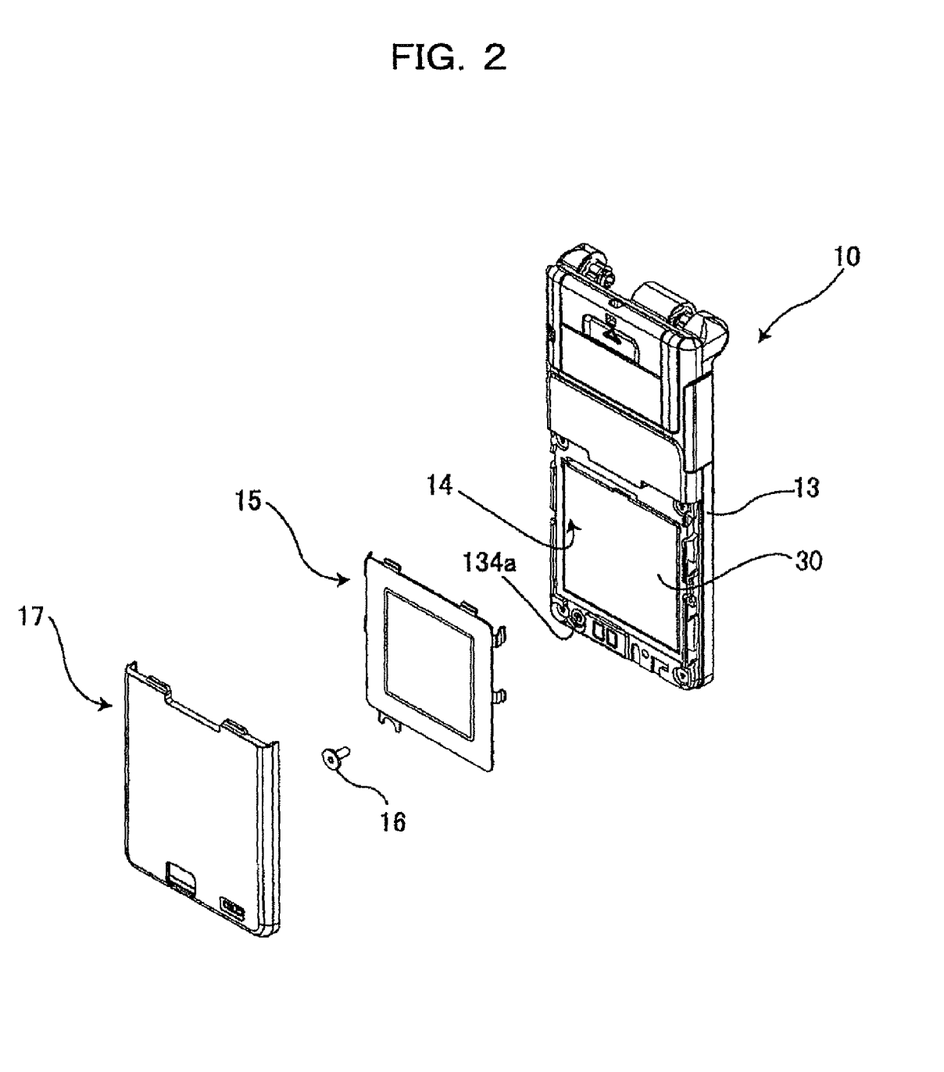
FIG. 2 is a perspective exploded view of the battery chamber of a body unit, as viewed from the rear of the body unit.

FIG. 2 is a perspective exploded view of the battery chamber of a body unit, as viewed from the rear of the body unit.

Figure 3:
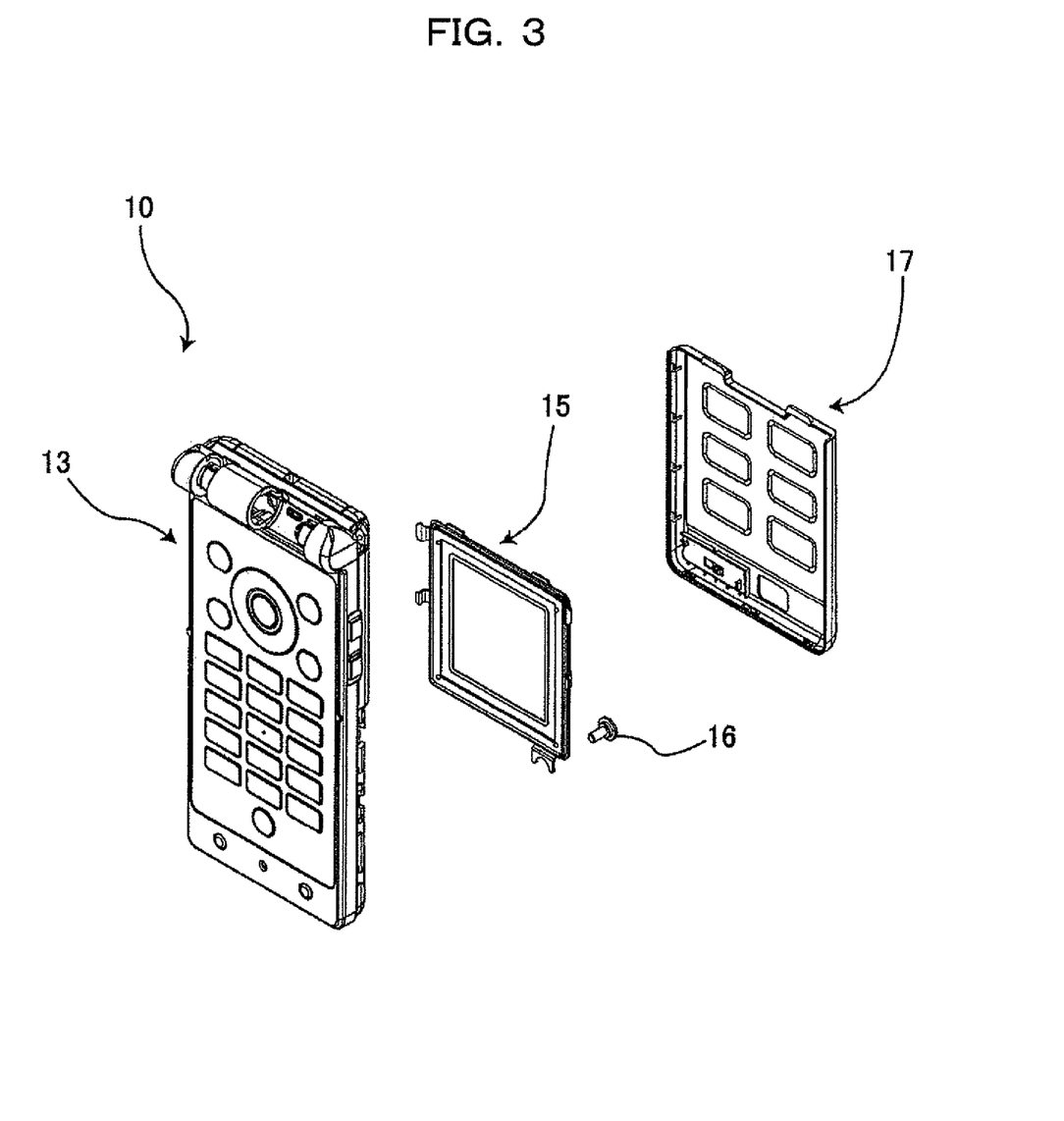
FIG. 3 is a perspective exploded view of the battery chamber and its periphery, as viewed from the front of the body unit.

FIG. 3 is a perspective exploded view of the battery chamber and its periphery, as viewed from the front of the body unit.

A housing 13 of the body unit 10 has a battery chamber 14, in which a battery pack 30, in the form of a rectangular plate, is loaded. The battery chamber 14 is rectangular like the battery pack 30, and has a depth matching the plate thickness of the battery pack 30.

The battery chamber 14 accommodating the battery pack 30 is covered with a rear cover plate 15 and fixed in position by a special screw 16 and, further, the rear cover plate 15 is covered with a rear cover 17. The rear cover plate 15 is an example of a battery lid.

Figure 4A:
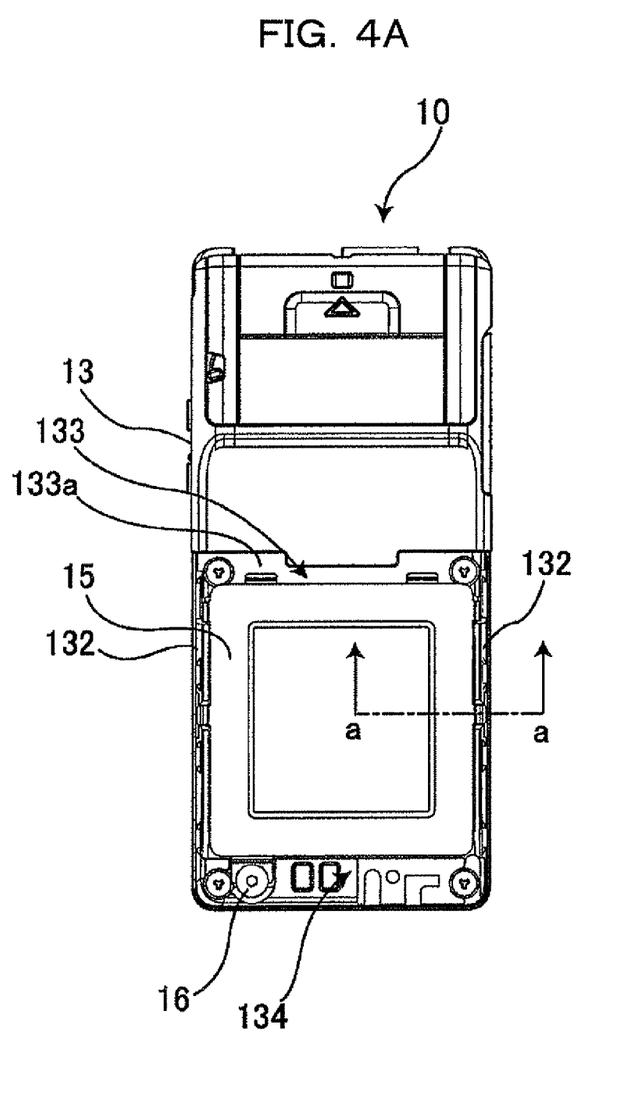
FIG. 4A is a top view of the body unit from which a rear cover is detached.
Figure 4B:
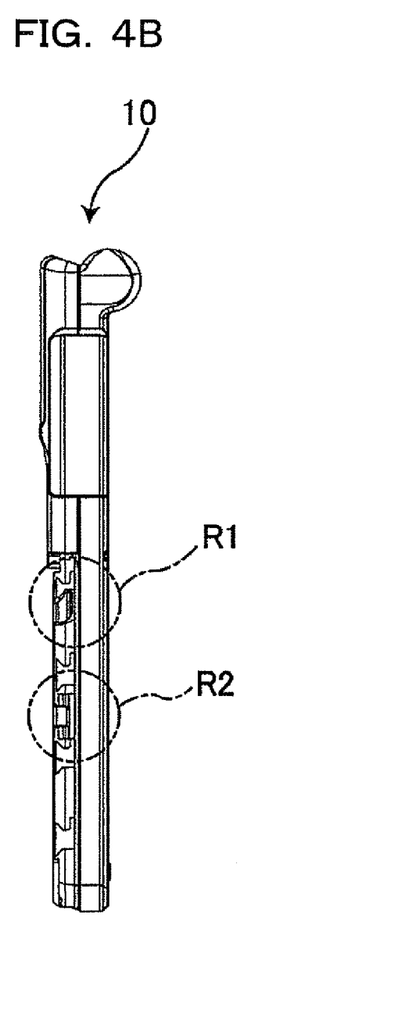
FIG. 4B is a side view of the body unit from which the rear cover is detached.

FIG. 4A is a top view of the body unit from which a rear cover is detached. FIG. 4B is a side view of the body unit from which the rear cover is detached;

There is shown the battery chamber covered with the rear cover plate 15 and fixed by the special screw 16, which may be, for example, a hexagonal screw.

Figure 5:
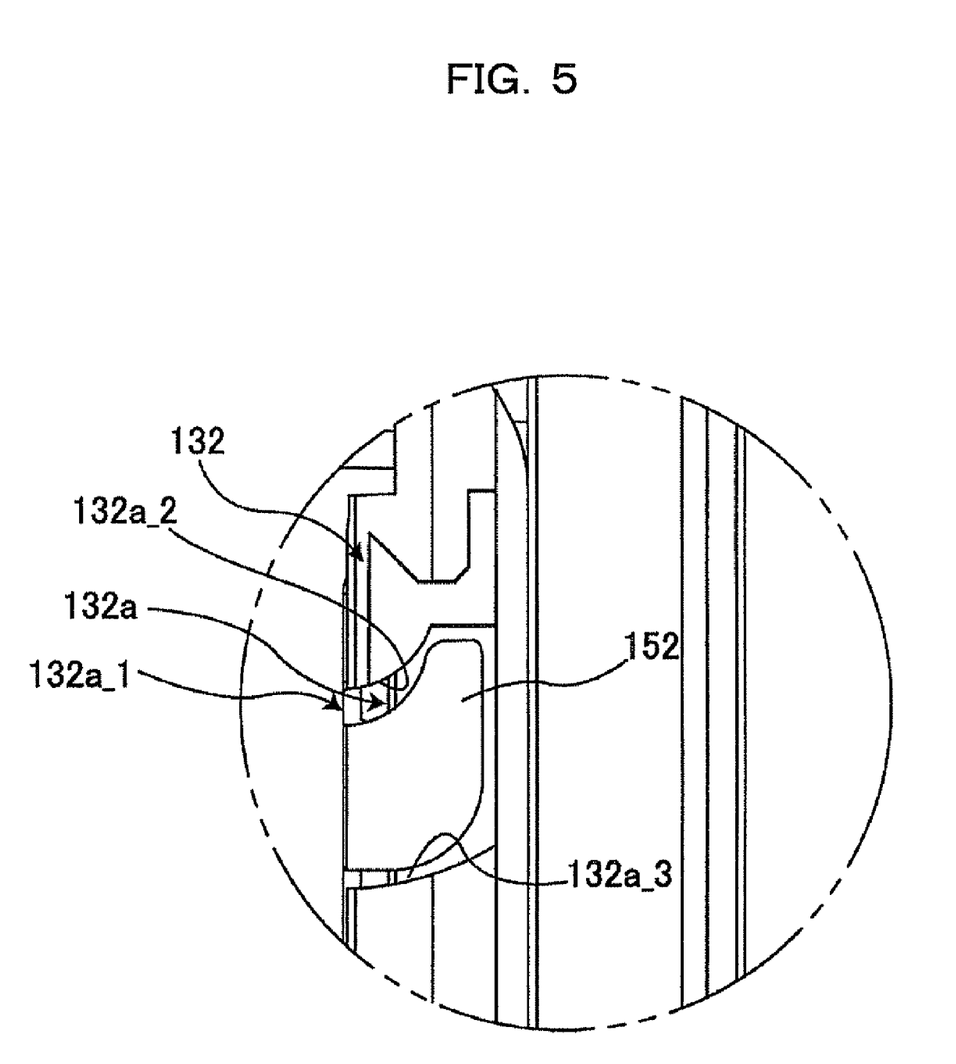
FIG. 5 is an enlarged view of a portion circled with R1 in FIG. 4.
Figure 6:
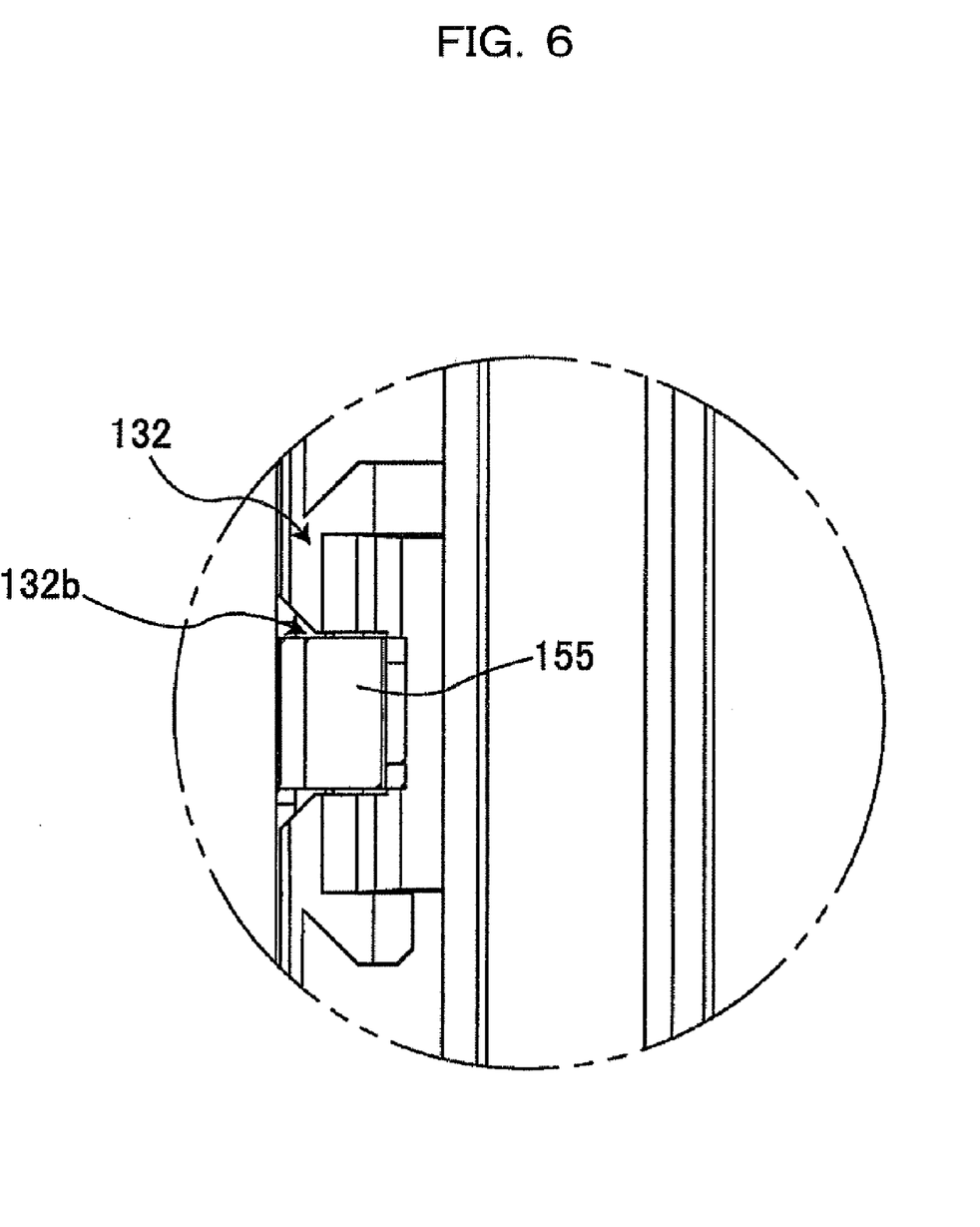
FIG. 6 is an enlarged view of a portion circled with R2 in FIG. 4.
Figure 7:
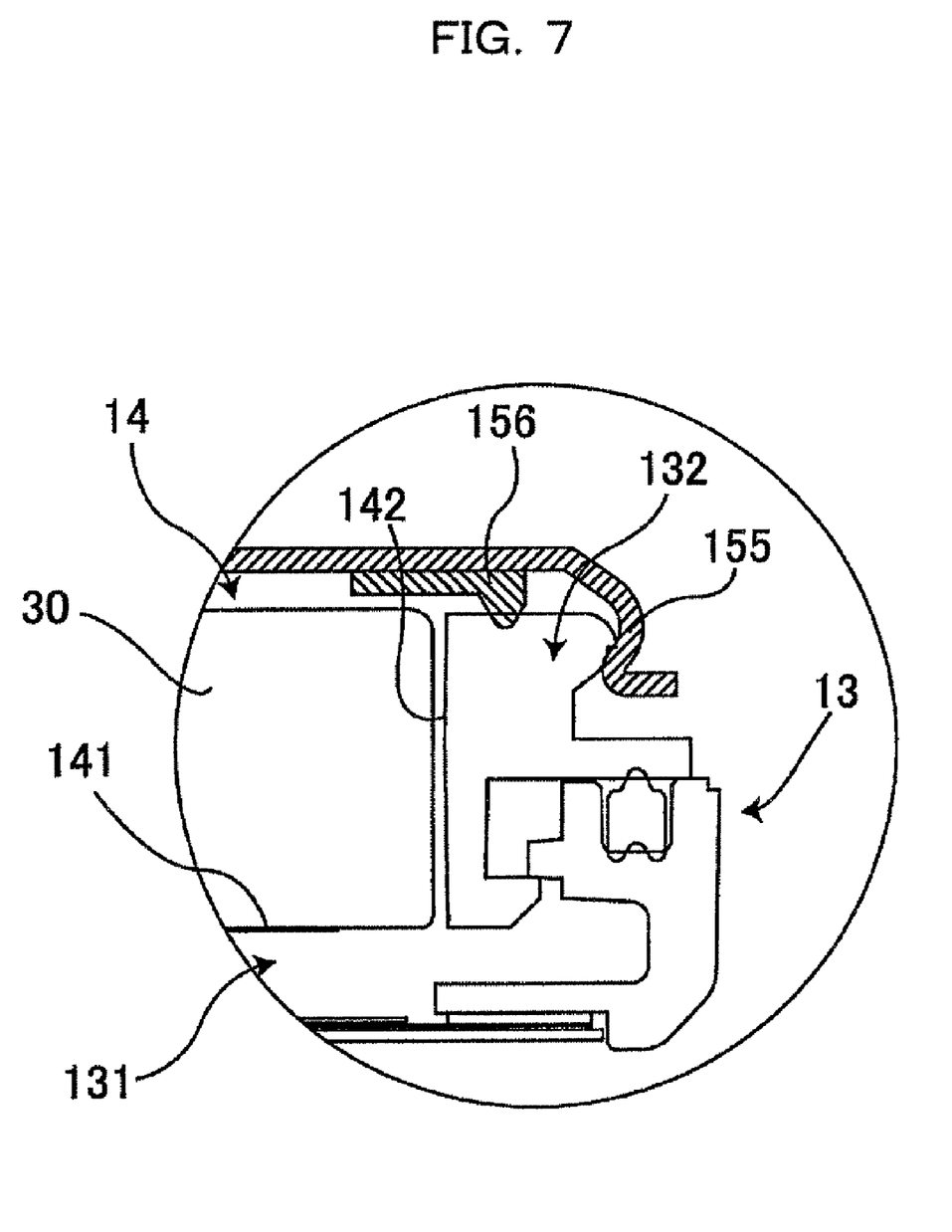
FIG. 7 is an enlarged sectional view of a portion, taken on the plane of the line indicated by arrows a-a in FIG. 4.

FIG. 5 is an enlarged view of a portion circled with R1 in FIG. 4. FIG. 6 is an enlarged view of a portion circled with R2 in FIG. 4. FIG. 7 is an enlarged sectional view of a portion, taken on the plane of the line indicated by arrows a-a in FIG. 4.

Formed in the housing 13 of the body unit 10 is the battery chamber 14, part of which is shown in FIG. 7. The housing 13 has a bottom 131 defining the bottom face 141 of the battery chamber 14, and upright portions 132 extending from the left and right edges of the bottom face 141. FIG. 7 shows the right edge. The internal wall faces of the upright portions 132 define the left and right wall faces 142 of the battery chamber 14. A groove, as shown in FIG. 5, serving as a hook receiving portion 132a is formed in the external wall face and near the front of each of the upright portions 132. FIG. 7 shows the right wall face. A positioning hook 152 formed on the rear cover plate 15 enters this hook receiving portion 132a.

As shown in FIG. 5, the shape of each of the hook receiving portions 132a is such that an opening 132a-1 is defined in the upper edge, the bottom faces 132a-2 and 132a-3 of both sides curve downwards and forwards from the opening 132a-1, specifically, rightwards and upwards as in FIG. 5, so that the entire groove extends downwards and forwards.

As shown FIGS. 4A and 4B, a front wall 133 and a rear wall 134 are formed at the front and back of the battery chamber 14 in the housing 13, respectively.

The front wall 133 extends upright from the front edge of the bottom face 141 of the battery chamber 14, thereby forming the front wall face of the battery chamber 14. In addition, seating 133a extends from the upper edge of the front wall face so as to be parallel to the bottom face 141.

The rear wall 134 extends upright from the rear edge of the bottom face 141 of the battery chamber 14, thereby forming the rear wall face of the battery chamber 14. In addition, behind the rear wall face, there is formed a screw hole 134a used to fasten the rear cover plate 15 by the special screw 16.

Behind the hook receiving portion 132a formed on the external wall face of each of the left and right upright walls 132, there is formed a groove, as shown in FIG. 6, serving as another hook receiving portion 132b, into which the corresponding fixing hook 155 of the rear cover plate 15 enters.

The fixing hooks 155 formed on the rear cover plate 15 temporarily fasten the rear cover plate 15 while sandwiching the left and right upright walls 132 of the battery chamber 14 of the housing 13 from left and right.

Figure 8A:
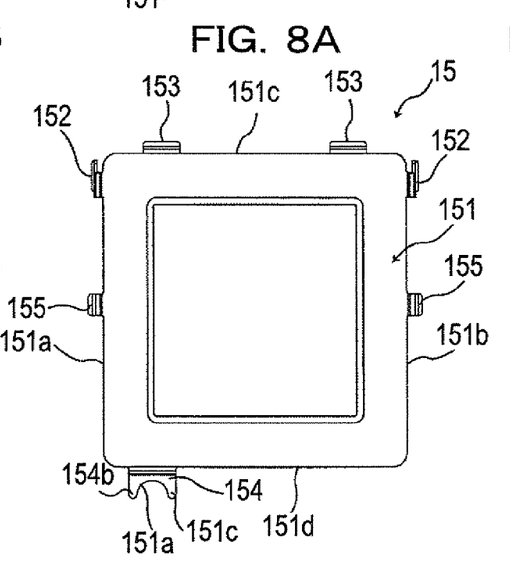
FIG. 8A is a front view of a rear cover plate.
Figure 8B:
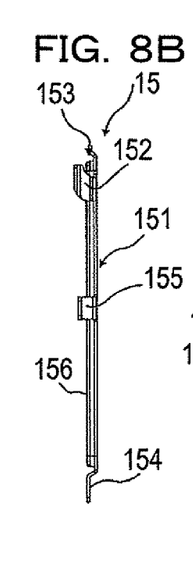
FIG. 8B is a left side view of the rear cover plate.
Figures 8C, 8F:
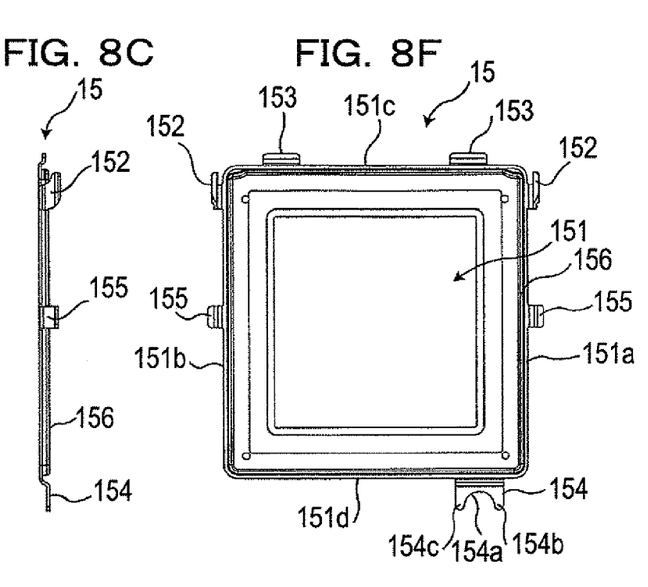
FIG. 8C is a right side view of the rear cover plate.
FIG. 8F is a rear view of the rear cover plate.
Figure 8D:
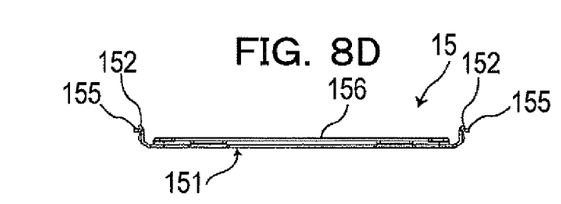
FIG. 8D is a top view of the rear cover plate.
Figure 8E:
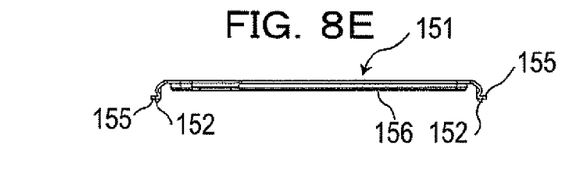
FIG. 8E is a bottom view of the rear cover plate.

FIG. 8A is a front view of a rear cover plate, FIG. 8B is a left side view of the rear cover plate, FIG. 8C is a right side view of the rear cover plate, FIG. 8D is a top view of the rear cover plate, FIG. 8E is a bottom view of the rear cover plate, FIG. 8F is a rear view of the rear cover plate.

This rear cover plate 15 is formed by sheet metal working of a single metal plate.

The rear cover plate 15 includes: a cover plate 151 extending wide enough to cover the battery chamber 14; and the pair of left and right positioning hooks 152 bent near the fronts of the left and right edges 151a and 151b of the cover plate 151. The rear cover plate 15 further includes overhanging lower edges 153 bent from the front edge 151c of the cover plate 151; a fixable portion 154 continuous with the rear edge 151d of the cover plate 151; and the pair of left and right fixing hooks 155 bent from the left and right edges 151a and 151b of the cover plate 151 and behind the corresponding positioning hooks 152. The rear cover plate 15 has a waterproof gasket 156 fixed to the battery chamber side of the cover plate 151.

The shape of the pair of left and right positioning hooks 152 is such that left and right positioning hooks 152 bend near the fronts of the left and right edges 151a and 151b of the cover plate 151 and curve forwards and downwards. The positioning hooks 152 position the battery lid 15 by entering the corresponding hook receiving portions 132a formed in the external wall faces of the pair of left and right upright walls 132 defining the left and right wall faces of the battery chamber 14.

The overhanging lower edges 153 bend from the front edge 151a of the cover plate 151. When the rear cover plate 15 is moved forward obliquely downward, the overhanging lower edges 153 regulate the upward or downward position of the rear cover plate 15 by coming into contact with the seating 133a of the front wall 133 forming the front wall of the battery chamber 14.

The overhanging lower edges 153 are formed in two places on the front edge 151c of the cover plate 151: one near the left side of the front edge 151c, the other near the right side thereof. They prevent leftward or rightward inclination of the rear cover plate 15 while it is being attached.

The overhanging lower edges 153 are shaped so that these edges 153 act only when the rear cover plate 15 is attached, and separate from the seating 133a after the attachment of the rear cover plate 15 so that no unnecessary force is applied to the rear cover plate 15.

The fixable portion 154 continuous with the rear edge 151d of the cover plate 151 of the rear cover plate 15 has two projections 154b and 154c defining a semicircular recess 154a between them. The recess 154a in the middle of fixable portion 154 is superposed on the screw hole 134a made in the rear wall 134 forming the rear wall face of the battery chamber 14 of the housing 13, and the fixable portion 154 is fastened with the special screw 16 (e.g., a hexagonal screw).

The pair of left and right fixing hooks 155 bend from the left and right edges 151a and 151b of the cover plate 151 of the rear cover plate 15 and behind the above-mentioned corresponding positioning hooks 152. These fixing hooks 155 temporarily fasten the rear cover plate 15 over the battery chamber 14 while sandwiching the external wall faces of the pair of left and right upright walls 132. The fixable portion 154 of the rear cover plate 15 temporarily fastened by the pair of left and right fixing hooks 155 is fastened to the housing 13 of the body unit 10 by the special screw 16.

The rear cover plate 15 has the pair of left and right positioning hooks 152. These positioning hooks 152 enter the corresponding hook receiving portions 132a formed in the external walls of the left and right upright walls 132 (one of which is shown in FIG. 5). Accordingly, simply by fastening the one fixable portion 154 by means of the one special screw 16 in one place, the rear cover plate 15 can be fixed in a position such that the battery chamber 14 is completely covered.

The gasket 156 fixed to the battery chamber side of the cover plate 151 is disposed in contact with all sides of the battery chamber 14, as shown in FIG. 7, and prevents water entering the battery chamber 14.

Figure 9:
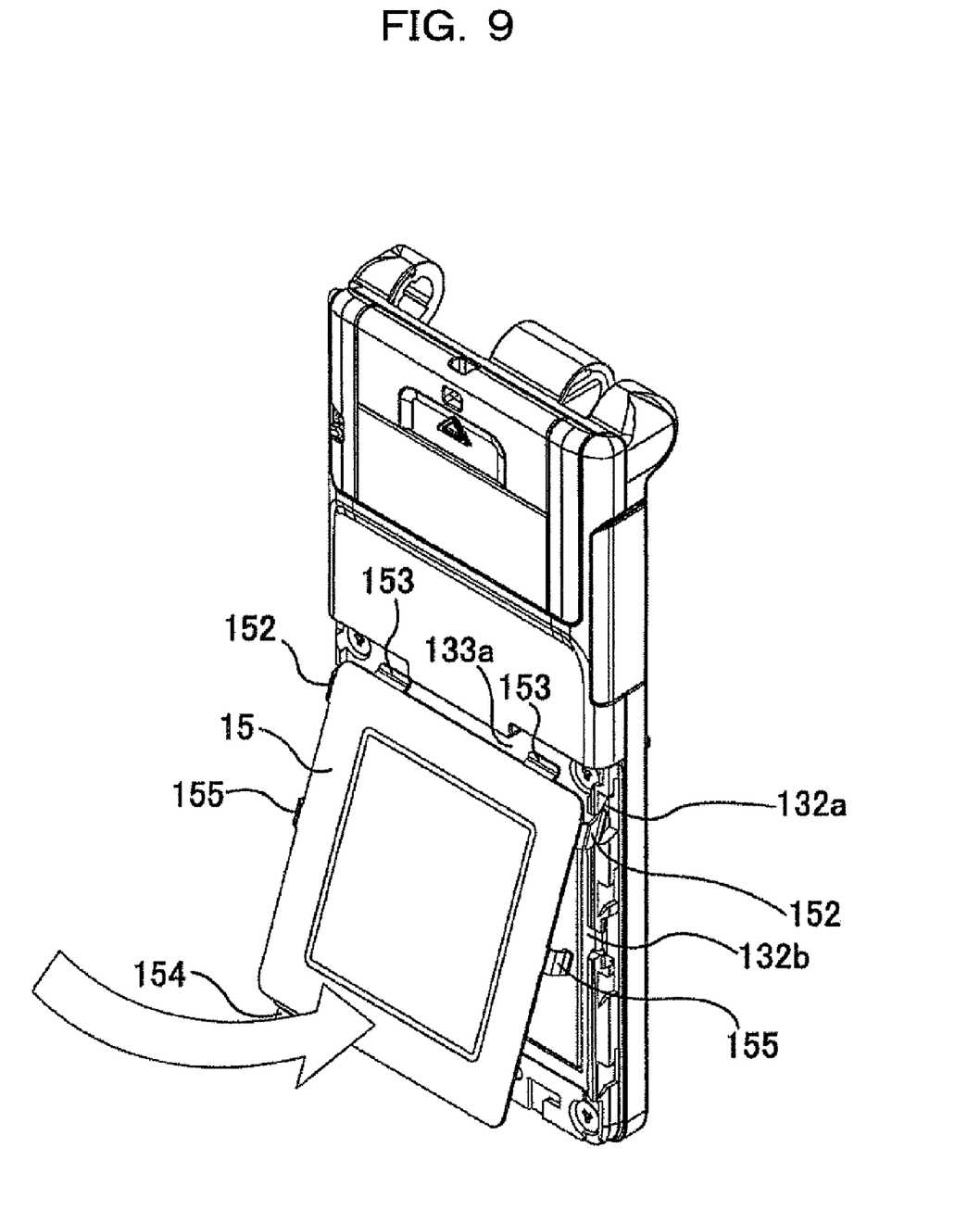
FIG. 9 shows the act of attaching the rear cover plate.
Figure 10:
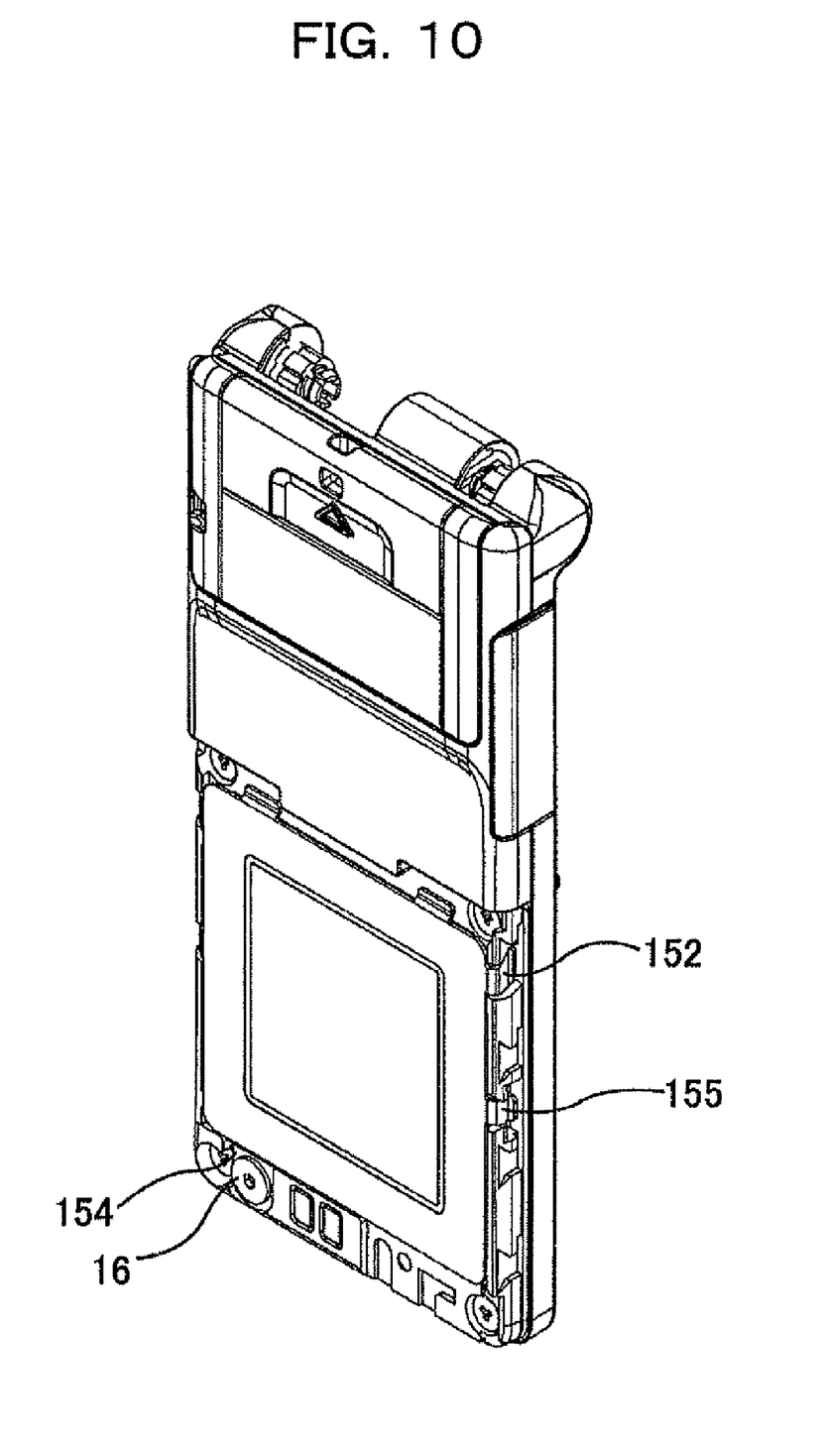
FIG. 10 shows the attached state of the rear cover plate.

To attach the rear cover plate 15, the rear cover plate 15 is moved forward obliquely downward, the overhanging lower edges 153 formed on the front end of the rear cover plate 15 are placed on the seating 133a, and the positioning hooks 152 are lowered into the grooves of the hook receiving portions 132a in the direction of the arrow. Consequently, the positioning hooks 152 enter the corresponding hook receiving portions 132a. By further lowering the positioning hooks 152, the fixing hooks 155 enter the corresponding hook receiving portions 132b, and the rear cover plate 15 is temporarily fastened. In this condition, the fixable portion 154 is fastened by the special screw 16.

Figure 11:
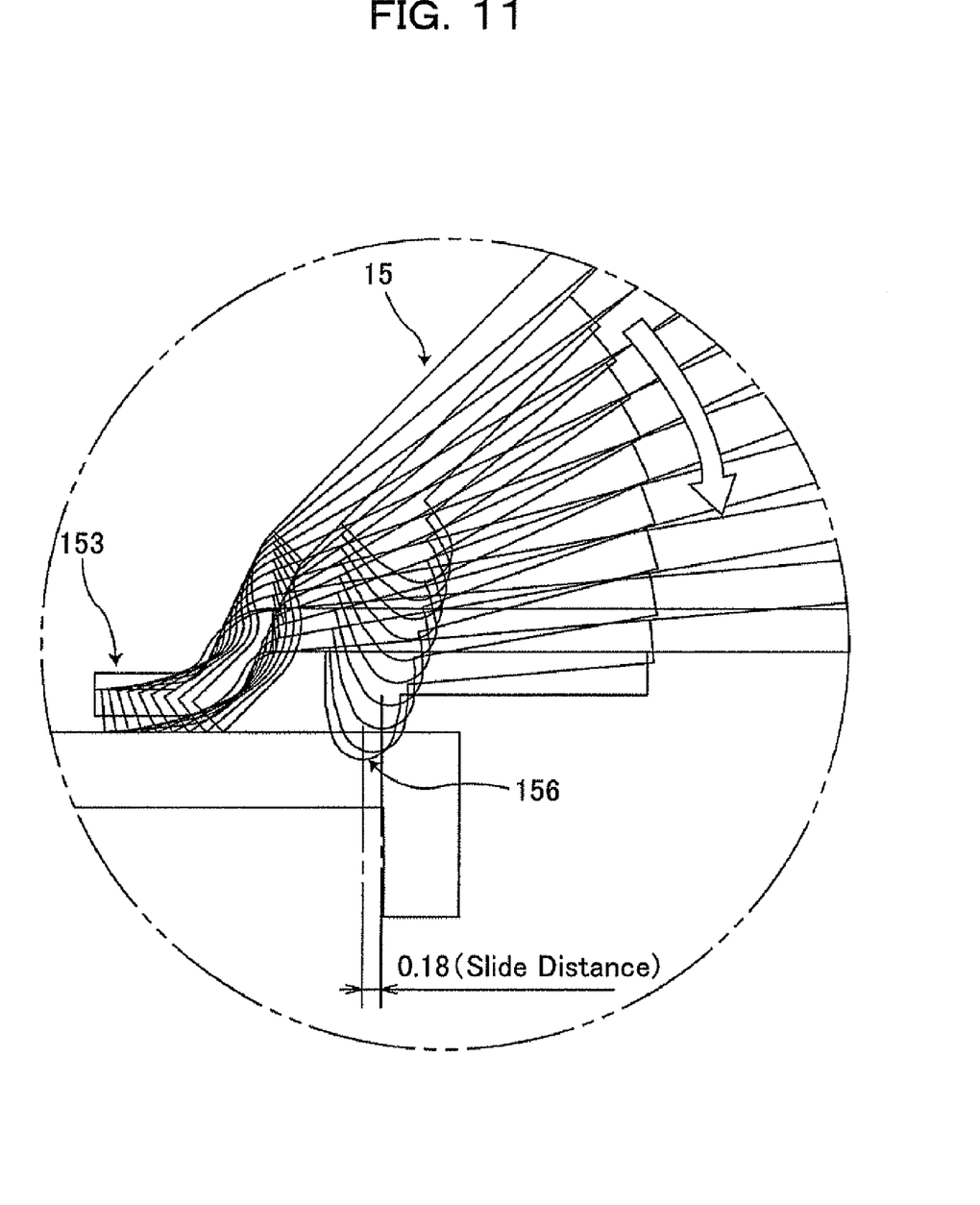
FIG. 11 shows the locus of downward movement of the rear cover plate.

This rear cover plate 15 is not designed so as to be vertically lowered onto the battery chamber 12 from directly above the battery chamber 14 but to be lowered onto the battery chamber 14 while being rotated as in the direction of the arrow shown in FIGS. 9 and 11. Although sideways force consequently acts on the gasket 156, the overhanging lower edges 153 position the rear cover plate 15 upwards or downwards in the course of the attachment of the rear cover plate 15. Further, since the pair of left and right positioning hooks 152 enter the corresponding hook receiving portions 132a, the movement of the rear cover plate 15 being attached is fixed in one direction, and the sideways movement of the gasket 156 is minimized regardless of operation by the user. In the example shown in FIG. 11, the sideways movement of the gasket has been set to a maximum slide distance of 0.18 mm.

Thus, in the preferred embodiment, the foregoing configuration minimizes the sideways movement of the gasket 156 regardless of the operation of the user, and hence provides a sufficiently secure waterproof function. This obviates the need for a structure to support the rear cover plate 15, when opened for the replacement of battery pack 30, so as to prevent separation of the rear cover plate 15 from the housing 13, and this contributes overall to a further reduction in size. In this embodiment, since the rear cover plate 15 is fixed by the special screw, the battery is less likely to be detached improperly. This makes it safer for children and hence offers a structure suitable for use in mobile phones for children.

A description was given of the waterproof structure of the battery chamber and its periphery. However, the other parts of the mobile phone 1 are also rendered waterproof.

The structure of the device in the preferred embodiment is such that when the battery lid is attached, the upward or downward position of the battery lid is restricted by the overhanging lower edges described above and, in this restricted state, the positioning hooks are inserted in the corresponding hook receiving portions. This structure renders movement of the gasket 156 far less liable to be affected by the closing of the lid by a user. Accordingly, sideways force applied to the waterproof gasket fixed to the battery chamber side of the lid can be kept within permissible levels. The lid is completely separated from the mobile device body. This eliminates the need for a structure to keep the lid in its open position joined to the housing, and contributes to a further size reduction.

The device according to the preferred embodiment includes the fastening portion and the fixable portion, and incorporates a structure for fastening the fixable portion to the fastening portion. Accordingly, in cooperation with the positioning hooks' entering the corresponding hook receiving portions, this structure fixes the battery lid in position while securely performing the waterproof function.

Since the device in the preferred embodiment has a pair of left and right fixing hooks, the lid is fixed in position while closed. Accordingly, the lid can be closed easily.

While the overhanging lower edges are in contact with the seating, force acts in the direction in which the battery lid is opened. However, in the preferred embodiment, the overhanging lower edges are separated from the seating while the battery lid is attached. Accordingly, application of unnecessary or adversely affecting force is prevented and the waterproof condition is maintained.

In the device according to the preferred embodiment, the overhanging lower edges are formed in two places on the front edge of the cover plate, one near the left side of the front edge, and the other near the right side thereof. This further suppresses leftward or rightward inclination of the gasket, reducing unnecessary torsion of the gasket to an even lower degree.

The design of the device in the preferred embodiment reduces the thickness of the device by forming the battery lid from a single metal plate, and also contributes to cost reduction by forming the battery lid by sheet metal working.

The device in the preferred embodiment has a pair of hook receiving portions and a pair of positioning hooks. Accordingly, the fastening portion and fixable portion placed in the same place suffice to fix the battery lid while maintaining sufficiently waterproof performance. Disposing the fastening portion and fixable portion only in the one place contributes to reduction in size and weight and improves efficiency in closing the lid.

Where a fixable portion has a shape such that a circular hole is made through it, the fixable portion may be caught and deformed by a projection of another battery lid during battery lid production process. However, the fixable portion of the device according to the present embodiment is semicircular, and is thus prevented from being caught, as in the above-mentioned case, while maintaining its ability to be fastened by a screw or the like.

The battery lid suffices to ensure waterproof performance. However, the device in the preferred embodiment includes a cover member covering the battery lid and forming part of the outer shape of the mobile device. Therefore, the design of the outer shape of the mobile device may incorporate the cover member, thus obtaining a more pleasing design and appearance.

The device disclosed in the preferred embodiment ensures sufficient waterproof performance for a battery chamber and its periphery while retaining the compact, lightweight design of the device.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the sprit and scope and scope of the invention.

What is claimed is:

1. A mobile device comprising:
a housing defining a battery chamber in which a battery is loaded; and
a battery lid for covering the battery chamber so as to be freely detached, the mobile device running on power supplied from the battery loaded in the battery chamber, wherein the housing includes:
a bottom defining a bottom face for the battery chamber;
a pair of left and right upright walls extending upright from the left and right edges of the bottom face such that the internal wall faces of the upright walls define left and right wall faces for the battery chamber, and having hook receiving portions formed in external wall faces of the upright walls and near the fronts of these external wall faces, each of the hook receiving portions being formed from a groove that has an open upper edge and curves downwards and forwards from this opening;
a front wall extending upright from the front edge of the bottom face, thereby defining a front wall face for the battery chamber, and defining seating extending forward from the upper edge of the wall face so as to be parallel to the bottom face; and
a rear wall extending from the rear edge of the bottom face, thereby defining a rear wall face of the battery chamber, and
the battery lid includes:
a cover plate covering the battery chamber;
a pair of left and right positioning hooks bent near the fronts of the left and right edges of the cover plate, curving downwards and forwards, and serving to position the battery lid by entering the grooves of the corresponding hook receiving portions;
overhanging lower edges bent from the front edge of the cover plate and serving to regulate upward or downward position of the cover lid by coming into contact with the seating when the battery lid is moved forward obliquely downward; and
a waterproof gasket fixed to the battery chamber side of the cover plate so as to be in contact with all sides of the battery chamber,
wherein the rear wall defines a rear wall face for the battery chamber and has, behind the rear wall face, a fastening portion for fastening the battery, and the battery lid further includes a fixable portion continuous with the rear edge of the cover plate and fixed to the fastening portion.

2. The mobile device according to claim 1, wherein the battery lid further includes a pair of left and right fixing hooks bent from the left and right edges of the cover plate and behind the corresponding positioning hooks, serving to fix the battery lid while sandwiching the external wall faces of the pair of left and right upright walls.

3. The mobile device according to claim 1, wherein the overhanging lower edges are shaped so as to be separated from the seating while the battery lid is attached.

4. The mobile device according to claim 1, wherein the overhanging lower edges are formed in two places on the front edge of the cover plate: one near the left side of the front edge, the other near the right side thereof.

5. The mobile device according to claim 1, wherein the battery lid is formed by sheet metal working of a single metal plate.

6. The mobile device according to claim 1, wherein the fixable portion is fastened to the fastening portion by means of a special screw.

7. The mobile device according to claim 1, wherein the fastening portion and the fixable portion are formed only in one place.

8. The mobile device according to claim 1, wherein the fixable portion has two projections defining a semicircular recess between them.

9. The mobile device according to claim 1, further comprising a cover member covering the battery lid and forming part of the outer shape of the mobile device.

10. The mobile device according to claim 1, wherein the mobile device is a mobile phone that has a radio communication function.

* * * * *